(12) United States Patent
Nanaumi et al.

(10) Patent No.: US 6,866,443 B2
(45) Date of Patent: Mar. 15, 2005

(54) FASTENING ASSISTANCE STRUCTURE

(75) Inventors: Kyosuke Nanaumi, Tochigi-ken (JP); Junya Ohta, Utsunomiya (JP); Koichi Kaiyama, Utsunomiya (JP); Kazuya Inoue, Kariya (JP)

(73) Assignees: Keihin Corporation, Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 10/462,731

(22) Filed: Jun. 17, 2003

(65) Prior Publication Data
US 2004/0003682 A1 Jan. 8, 2004

(30) Foreign Application Priority Data
Jun. 20, 2002 (JP) ........................................ 2002-180091

(51) Int. Cl.[7] .............................................. F16B 33/00
(52) U.S. Cl. .................................. 403/408.1; 403/374.3
(58) Field of Search ......................... 403/408.1, 374.3, 403/374.2, 370; 411/352, 353, 531, 533, 970, 999, 546

(56) References Cited

U.S. PATENT DOCUMENTS

| 3,527,280 A | * | 9/1970 | Macnorius | .............. 411/970 X |
| 4,640,524 A | * | 2/1987 | Sedlmair | ................ 411/999 X |
| 6,308,483 B1 | * | 10/2001 | Romine | .................. 411/531 X |
| 2003/0091386 A1 | * | 5/2003 | Ting | ........................ 403/408.1 |

* cited by examiner

Primary Examiner—John R. Cottingham
(74) Attorney, Agent, or Firm—Birch, Stewart, Kolasch & Birch, LLP

(57) ABSTRACT

A fastening assistance structure has a bolt hole for passing therethrough a threaded portion of a bolt, a seat face for engaging a head seat face of the bolt, and a partition wall for guiding the bolt into the bolt hole. A bolt inlet which is open at an end of the partition wall lies flush with an end face of a bulge. Even when the bolt hole is positioned behind the bulge, the bolt inlet can be seen, and the bolt can be inserted from the bolt inlet into the partition wall. If the partition wall has an inner wall of a tapered shape progressively smaller in diameter toward the bolt hole, then the bolt can easily be inserted along the inner wall of the partition wall into the bolt hole.

19 Claims, 8 Drawing Sheets

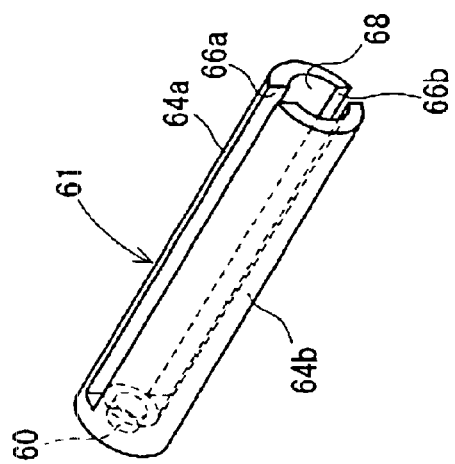
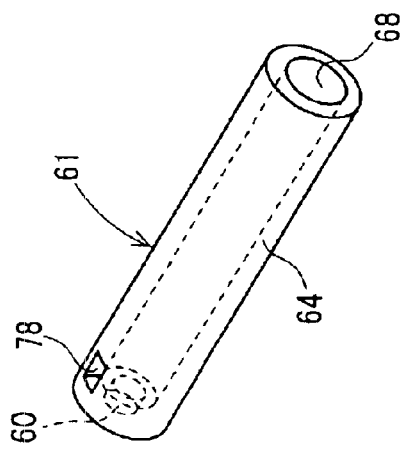
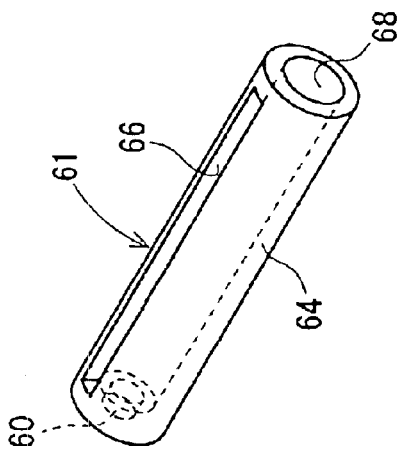

FASTENING ASSISTANCE STRUCTURE

BACKGROUND OF THE INVENTION

1. Field of the Invention

The present invention relates to a fastening assistance structure for fastening different workpieces with bolts, and more particularly to a fastening assistance structure which is highly convenient for fastening workpieces with bolts in a small space.

2. Description of the Related Art

Resin-molded products are widely used because they are inexpensive, can be mass-produced, and can be molded to complex shapes. Some resin-molded products are suitable for use as covers for covering structural objects. If a resin-molded product is to be used as a cover for covering a structural object, it is molded to a shape that matches the structural object to be covered for thereby reliably protecting the structural object and effectively utilizing a space.

For covering a structural object with a resin-molded cover, it is the customary practice to insert bolts through bolt holes in the resin-molded cover and fasten the structural object and the resin-molded cover with the bolts.

A resin-molded cover for use in a vehicle air-conditioning system is required to be positioned in a limited space, and hence bolt holes used to install the resin-molded cover are subject to certain positional limitations. Since internal structural objects of a vehicle air-conditioning system are complex in shape, resin-molded covers for covering the internal structural objects are also complex in shape, posing further positional limitations on bolt holes for installing the resin-molded covers.

Some bolt holes defined in resin-molded covers are thus positioned in locations which are not easily accessible for bolts and tools. If a vehicle air-conditioning system is assembled as a single unit, then no problem arises out of installing a resin-molded cover because it has already been assembled in the unit. However, if a resin-molded cover is to be installed on and removed from a vehicle air-conditioning system component which has already been mounted on a vehicle, then some bolt holes used to install the resin-molded cover may be positioned in a small space or place which cannot directly be seen from outside. In such a small space or place, bolts and tools cannot easily be inserted in position.

SUMMARY OF THE INVENTION

It is a general object of the present invention to provide a fastening assistance structure for fastening workpieces with bolts easily even in places which are not easily accessible, such as small spaces.

A major object of the present invention is to provide a fastening assistance structure which allows the worker to visually recognize the heads of bolts after workpieces are fastened by the bolts.

Another object of the present invention is to provide a fastening assistance structure which can easily be formed to shape.

According to the present invention, there is provided a fastening assistance structure comprising a bolt hole for passing therethrough a threaded portion of a bolt for fastening workpieces to each other, a seat face formed on a peripheral edge of the bolt hole for engaging a head seat face of the bolt or a washer combined with the bolt, and a guide passage formed in one of the workpieces, the guide passage extending from a peripheral edge of the seat face for guiding the bolt into the bolt hole.

The guide passage guides the bolt to be easily inserted into the bolt hole, so that the bolt can easily be fastened even in a place which is difficult to access.

The guide passage may have a slit facing at least the bolt hole. If the guide passage can be seen from outside, then the bolt as it is moved through the guide passage into the bolt hole can be confirmed through the slit.

If the slit comprises an elongate hole extending nearly to a bolt inlet which is open at an end of the guide passage and the bolt inlet has an annular shape, then the fastening assistance structure has an increased mechanical strength.

The guide passage may have a plurality of the slits each splitting a bolt inlet which is open at an end of the guide passage. The slits divide the guide passage into two guide passages, which are elastically deformable away from each other for easy insertion of the bolt into the bolt inlet.

The fastening assistance structure may further have a guide groove for inserting the bolt into a bolt inlet which is open at an end of the guide passage.

The guide passage may have such a tapered shape that the guide passage has an inner wall progressively smaller in diameter toward the bolt hole. The tapered shape of the guide passage allows the bolt to be inserted easily into the bolt hole, and also allows a core to be easily removed from the inner wall of the guide passage when the fastening assistance structure is molded.

The bolt inlet may be is displaced out of alignment with the seat face toward one of the workpieces in which the guide passage is defined. With this arrangement, a step between the bolt inlet and the workpiece is reduced to allow the bolt to be easily inserted.

If the guide passage has an outer wall having a constant thickness, then when the fastening assistance structure is molded, it is cooled at a substantially uniform rate, and hence is molded with increased accuracy.

If the guide passage has an outer wall of a tapered shape having a thickness progressively larger toward the bolt hole, then a core can easily be removed from the guide passage when the fastening assistance structure is molded, and the bolt can easily be inserted into the guide passage.

If the guide passage has a short hole defined therein at a position facing the bolt hole, then the head of the bolt as it is threaded into the bolt hole can be seen through the short hole, and the guide passage has its mechanical strength prevented from being lowered.

If the seat face is tapered toward the bolt hole, then the tip end of the bolt can be inserted into the bolt hole more easily. The tapered seat face matches the head seat face of a flat-head bolt.

If the guide passage is made of a transparent synthetic resin which allows the guide passage to be seen through, then the bolt inserted in the guide passage can be seen without any slit defined in the guide passage.

If a fixed nut is disposed in a hole defined in communication with the bolt hole, then a metric coarse thread bolt may be used for being threaded into the fixed nut.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8A is a perspective view of a bolt guide having a slit and a bolt inlet which are spaced from each other;

FIG. 8B is a perspective view of a bolt guide having a short hole defined therein near a bolt hole; and FIG. 8C is a perspective view of a bolt guide having two slits.

DESCRIPTION OF THE PREFERRED EMBODIMENTS

A fastening assistance structure according to a preferred embodiment of the present invention will be described with reference to FIGS. 1 to 8C.

Figure 1:
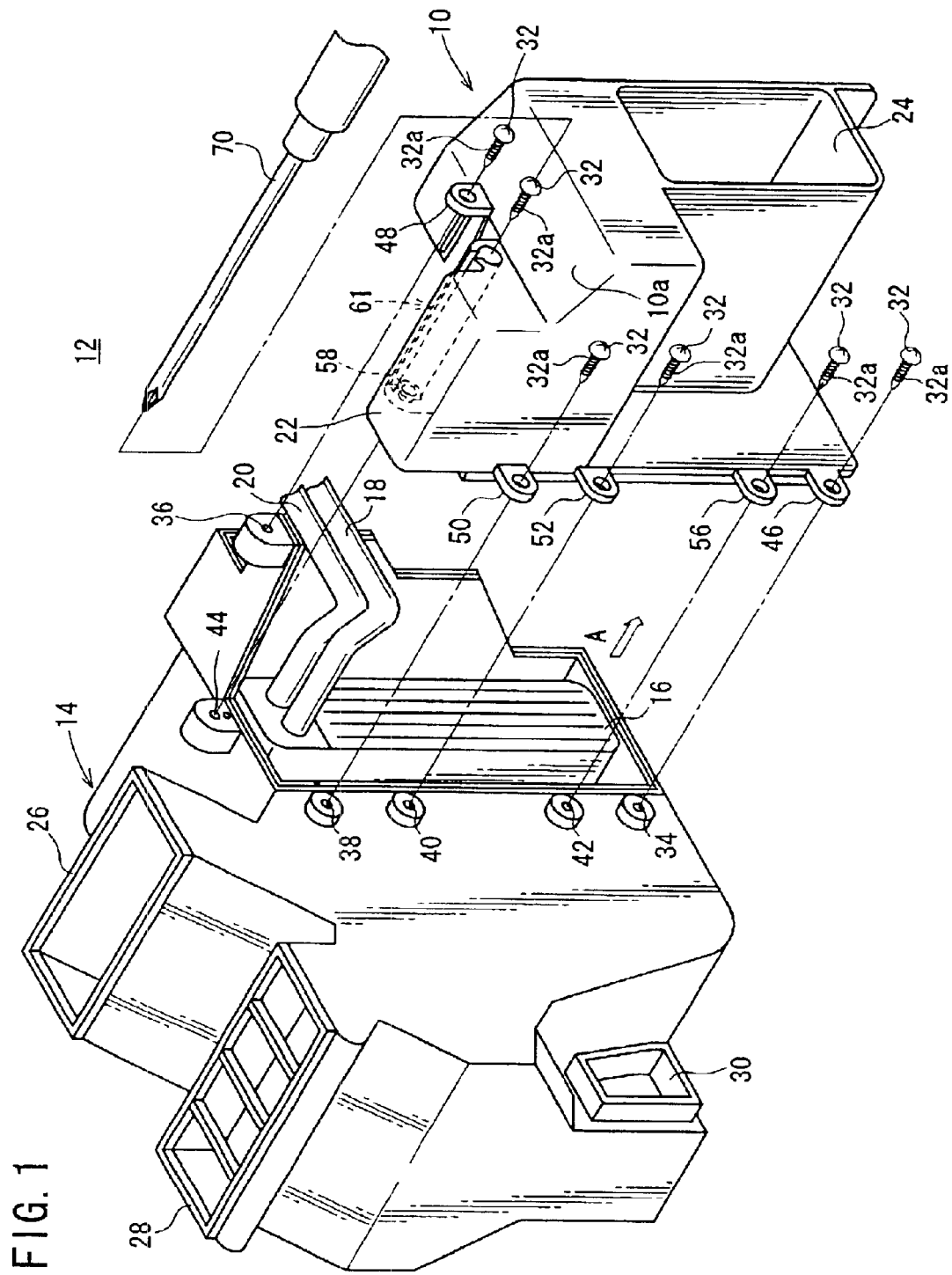
FIG. 1 is a perspective view of a resin-molded cover having a fastening assistance structure according to the present invention and parts associated therewith.

As shown in FIG. 1, a bolt guide (fastening assistance structure) 61 according to the embodiment of the present invention is disposed on a resin-molded cover (workpiece) 10 which is part of a vehicle air-conditioning system 12. The resin-molded cover 10 covers about one half of a side surface of a main body (workpiece) 14. Specifically, the resin-molded cover 10 covers a side surface of an evaporator 16 and portions of a high-pressure pipe 18 and a low-pressure pipe 20 which are connected to an upper portion of the side surface of the evaporator 16. The resin-molded cover 10 has a bulge 22 disposed on an upper portion thereof and shaped complementarily to the portions of the high-pressure pipe 18 and the low-pressure pipe 20. The bulge 22 protects the portions of the high-pressure pipe 18 and the low-pressure pipe 20. The resin-molded cover 10 has an air supply hole 24 defined in a side thereof for being supplied with air from a blower fan (not shown). Air supplied to the air supply hole 24 flows through the resin-molded cover 10 to the evaporator 16. When the resin-molded cover 10 is removed from the main body 14, the evaporator 16 can slide in the direction indicated by the arrow A, and the evaporator 16 is removed from the main body 14 for replacement with a new evaporator 16.

The vehicle air-conditioning system 12 serves to adjust the temperature and humidity of air in a passenger's compartment of a vehicle, and is disposed within a front console of the vehicle. The vehicle air-conditioning system 12 adjusts the temperature and humidity of air supplied from the blower fan with the evaporator 16 and a heater core (not shown), and delivers the air from a defroster outlet 26, a face outlet 28, and/or a foot outlet 30.

With the vehicle air-conditioning system 12 installed in the vehicle, the resin-molded cover 10 is placed in a small space within the front console. Particularly, the bulge 22 has its rear surface hidden in a small space and not visible from the passenger's compartment. If the resin-molded cover 10 were of a conventional structure, then the worker would have to work on the rear surface of the bulge 22 while groping around or using a hand mirror, and such a working process is highly inconvenient to carry out. The resin-molded cover 10 according to the present invention has a structure, to be described below, for facilitating a bolt fastening process on the rear surface of the bulge 22.

The resin-molded cover 10 is fastened to the main body 14 by a plurality of bolts 32, e.g., tapping screws with cross-recessed heads. The main body 14 has self-tapping holes 34, 36, 38, 40, 42, 44 defined therein for receiving respective threaded portions 32a of the bolts 32. The threaded portion 32a of one of the bolts 32 is threaded through a mounting seat 46 on the resin-molded cover 10 into the self-tapping hole 34, for example.

Similarly, one of the bolts 32 is threaded through a mounting seat 48 into the self-tapping hole 36. One of the bolts 32 is threaded through a mounting seat 50 into the self-tapping hole 38. One of the bolts 32 is threaded through a mounting seat 52 into the self-tapping hole 40. One of the bolts 32 is threaded through a mounting seat 56 into the self-tapping hole 42. The self-tapping hole 44 is associated with a seat face 58 (see FIG. 2) of the resin-molded cover 10. The threaded portion 32a of one of the bolts 32 is inserted through a bolt hole 60 defined centrally in the seat face 58 and threaded into the self-tapping hole 44.

Figure 2:
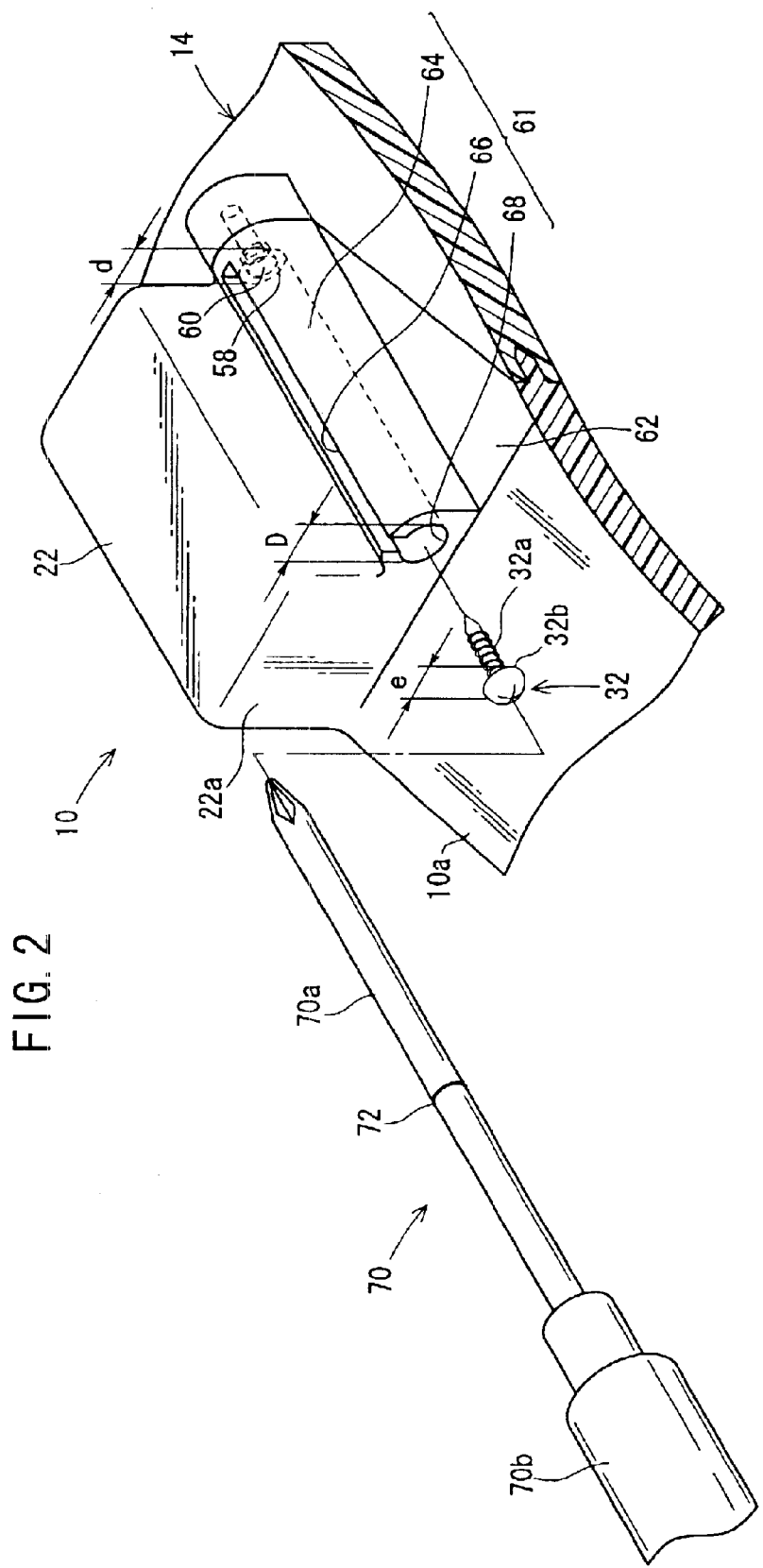
FIG. 2 is an enlarged fragmentary perspective view of the fastening assistance structure according to the present invention.

As shown in FIG. 2, the bolt guide 61 for guiding the bolt 32 to the bolt hole 60 is disposed along an edge of the bulge 22. The bolt hole 60 has a diameter which is slightly greater than the diameter of the threaded portion 32a. The bolt guide 61 has the seat face 58, the bolt hole 60, a cylindrical partition wall (guide passage) 64 having portions integrally formed with a resin surface 62 and the edge of the bulge 22, and a slender slit 66 defined longitudinally in an upper surface of the partition wall 64. The partition wall 64 has an end integral with a peripheral edge of the seat face 58. The other end of the partition wall 64 has a bolt inlet 68 defined therein for insertion of the bolt 32 therein. The resin-molded cover 10 has a slanted surface 10a lying in front of the bolt inlet 68 and inclined upwardly toward the bolt inlet 68.

The seat face 58 has a circular shape. The bolt inlet 68 has an arcuate C shape slotted by the slit 66. The seat face 58 has a diameter d smaller than the diameter D of the arcuate shape of the bolt inlet 68. The diameter d of the seat face 58 is slightly larger than the diameter e of the head of the bolt 32.

Figure 3:
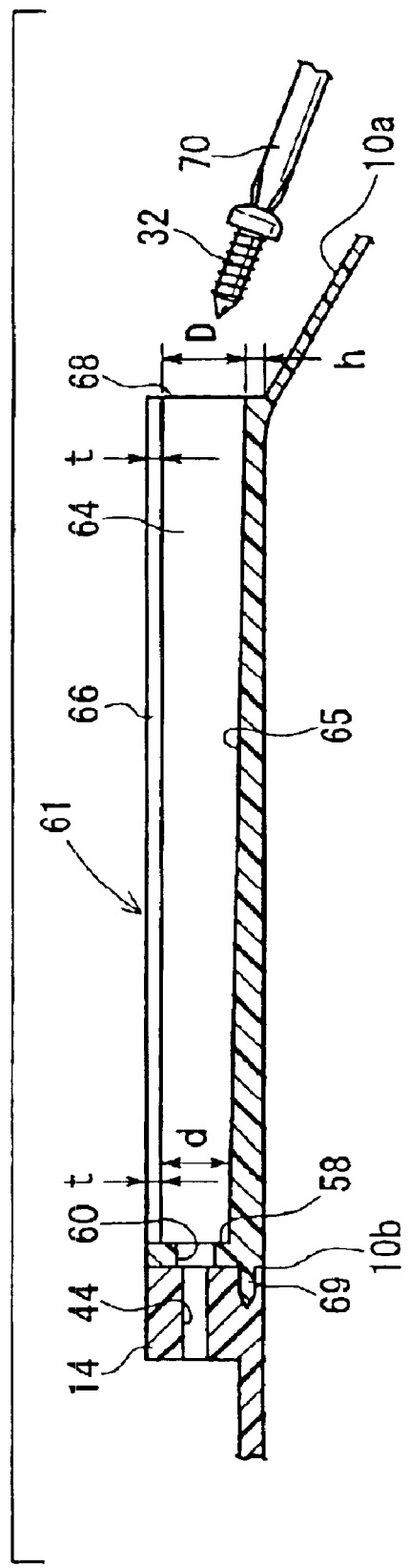
FIG. 3 is a cross-sectional view of a bolt guide and parts associated therewith.

As shown in FIG. 3, the portion of the partition wall 64 in which the slit 66 is defined has a constant thickness t. Because of the constant thickness t, when the bolt guide 61 is molded, it is cooled at a substantially uniform rate. Therefore, the bolt guide 61 is molded with increased accuracy, with the slit 66 having a constant width. The partition wall 64 has a lower surface 65 slanted upwardly toward the bolt hole 60. Therefore, the inner surface of the partition wall 64 is tapered off, or progressively reduced in diameter, toward the bolt hole 60. The tapered inner surface of the partition wall 64 is effective to guide the inserted bolt 32 smoothly and easily into positional alignment with the bolt hole 60. The tapered inner surface of the partition wall 64 also allows a core to be easily removed from the partition wall 64 when the bolt guide 61 is molded.

Because the lower surface 65 of the partition wall 64 is slanted upwardly toward the bolt hole 60, a step h between the lower end of the partition wall 64 at the bolt inlet 68 and the slanted surface 10a has a small dimension. The seat face 58 and the bolt hole 60 are slightly displaced upwardly out of horizontal alignment with the bolt inlet 68, providing a certain vertical distance between an edge 10b of an opening in the resin-molded cover 10 near the main body 14 and the bolt hole 60. A ridge 69 projects toward the main body 14 from the portion of the resin-molded cover 10 between the edge 10b and the bolt hole 60. The ridge 69 extends fully around the edge 10b at a position slightly outward of the edge lob. The main body 14 has a fitting groove defined therein, and the ridge 69 is fitted in the fitting groove, thus easily positioning the main body 14 in alignment with the resin-molded cover 10. The ridge 69 and the fitting groove in which the ridge 69 is fitted jointly make up a sealing structure for preventing air in the resin-molded cover 10 from leaking out. As the bolt hole 60 is slightly displaced upwardly, the bolt hole 60 does not present a positional obstacle to the ridge 69.

The partition wall 64 has such a small wall thickness that it does not shrink due to thermal strain immediately after the partition wall 64 is molded. The bolt inlet 68 lies flush with an end face 22a of the bulge 22.

Figure 4:
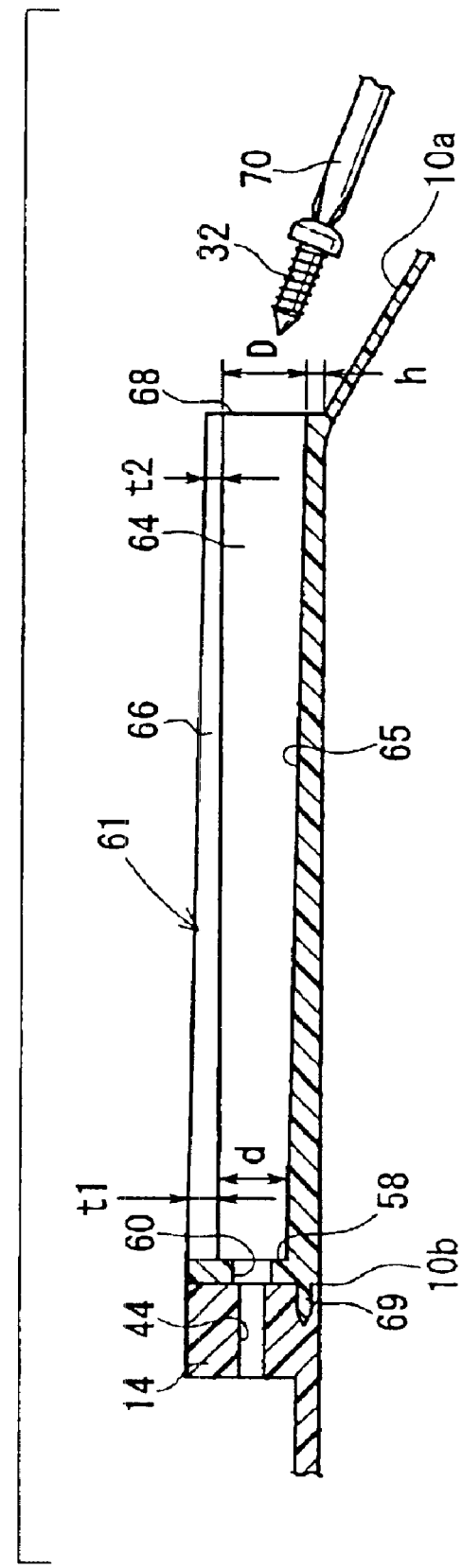
FIG. 4 is a cross-sectional view of a bolt guide, which has a partition wall including an outer wall progressively thicker toward a bolt hole, and parts associated therewith.

As shown in FIG. 4, the outer wall portion of the partition wall 64 may have a tapered cross-sectional shape such that its thickness progressively increases toward the bolt hole 60. Specifically, the partition wall 64 may have a thickness t1 near the bolt hole 60 which is greater than the thickness t2 thereof near the bolt inlet 68. The tapered cross-sectional shape of the outer wall portion of the partition wall 64 is effective to allow a core to be more easily removed from the outer wall portion of the partition wall 64 when the bolt guide 61 is molded.

A process of fastening the resin-molded cover 10 thus constructed to the main body 14 will be described below.

Figure 5:
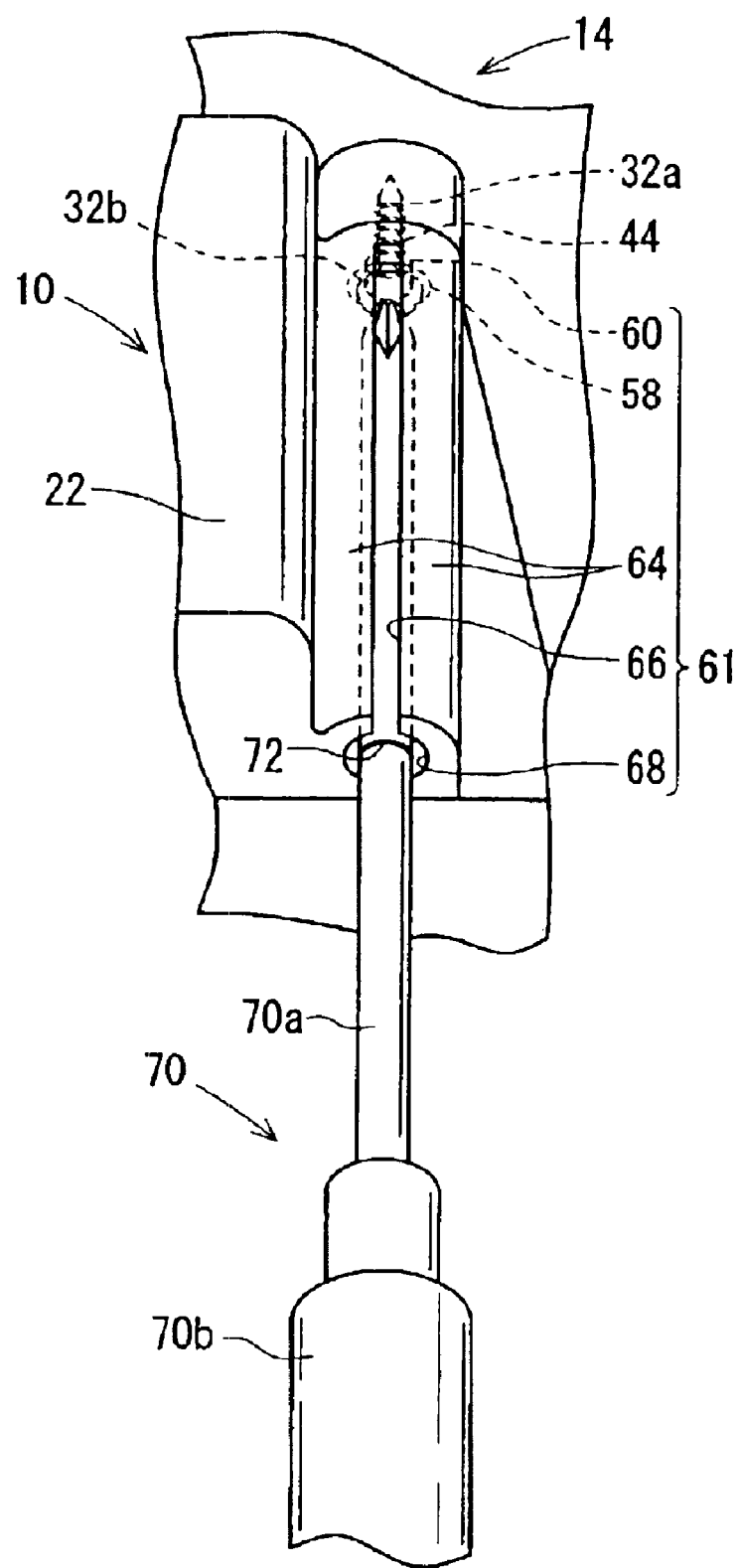
FIG. 5 is an enlarged fragmentary plan view showing the manner in which a bolt and a tool are inserted into the bolt guide.

For assembling the vehicle air-conditioning system 12 as a single unit, as shown in FIG. 5, the worker positionally aligns the resin-molded cover 10 with the main body 14. Then, the worker puts the bolt 32 on the tip of a screwdriver 70 and inserts the bolt 32 into the bolt guide 61 through the bolt inlet 68. The screwdriver 70 should preferably have a magnetic shaft 70a for magnetically attracting the bolt 32 to the tip of the shaft 70a. The bolt 32 can easily be inserted into the bolt guide 61 as the bolt 32 is firmly held on the tip of the shaft 70a when the bolt 32 is pushed in by the screwdriver 70.

When the bolt 32 is pushed into the bolt guide 61 along the partition wall 64, the bolt 32 is prevented from slipping out of the slit 66 because the slit 66 has a small width. Since the inner wall surface of the partition wall 64 has such a tapered shape that the inner wall surface is progressively smaller in diameter toward the bolt hole 60, the bolt 32 is guided toward the bolt hole 60 as the bolt 32 is pushed in. The threaded portion 32a of the bolt 32 can thus easily be inserted into the bolt hole 60. If the bolt guide 61 is oriented vertically, then the bolt 32 may be dropped by gravity into the bolt guide 61 from the bolt inlet 68.

Inasmuch as the slit 66 is continuously open in the longitudinal direction of the bolt guide 61, the worker can easily visually confirm the position of the bolt 32 through the slit 66 as the bolt 32 is inserted in the bolt guide 61.

After the tip end of the threaded portion 32a reaches the self-tapping hole 44 in the main body 14, the worker turns a grip 70b of the screwdriver 70 to thread the threaded portion 32a into the self-tapping hole 44. The bolt 32 is threaded into the self-tapping hole 44 as the threads of the threaded portion 32a bite into the inner surface of the self-tapping hole 44.

The bolt 32 is threaded into the self-tapping hole 44 until the bolt 32 has its head seat face 32b pressed against the seat face 58, fastening the resin-molded cover 10 to the main body 14. Thereafter, the worker removes the screwdriver 70. After the removal of the screwdriver 70, the worker can visually confirm the head of the bolt 32 through the slit 66 to see, for example, if the head seat face 32b is reliably in contact wit the seat face 58. This checking process is useful in inspecting the assembled vehicle air-conditioning system 12 when it is shipped as a single unit.

The mounting seats 46, 48, 50, 52, 56 (see FIG. 1) have a conventional structure, and bolts 32 are inserted therethrough and threaded into the corresponding self-tapping holes 34, 36, 38, 40, 42 in the main body 14 by the screwdriver 70 in the usual manner. The resin-molded cover 10 is thus firmly fastened to the main body 14.

Figure 6:
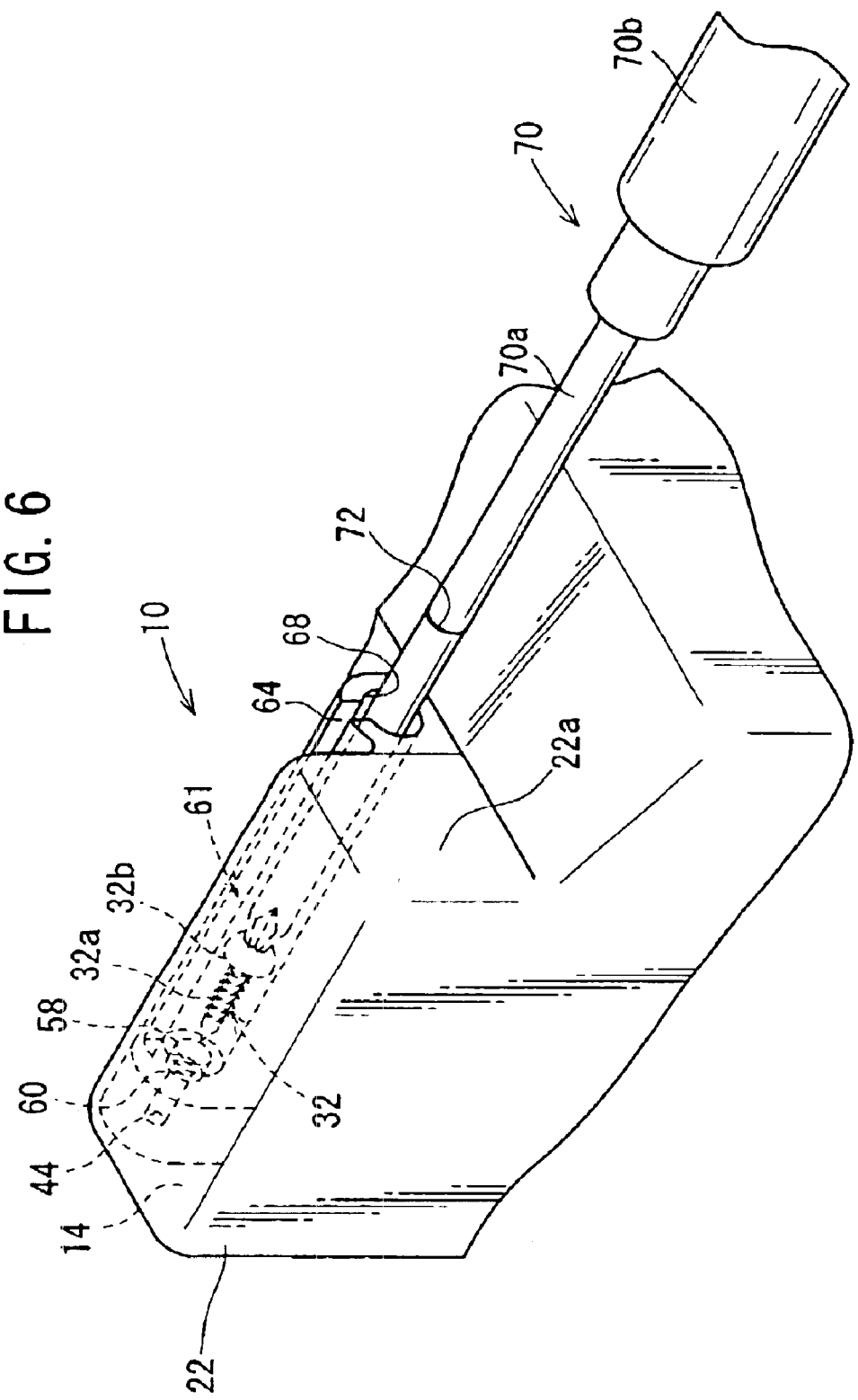
FIG. 6 is an enlarged fragmentary perspective view showing the manner in which the bolt and the tool are inserted into the bolt guide.

With the vehicle air-conditioning system 12 installed in place on a vehicle, the worker in the passenger's compartment can see the bulge 22 and the bolt inlet 68 as shown in FIG. 6. The worker cannot see the seat face 58 and the bolt hole 60 as they are located behind the bulge 22. Since the bolt inlet 68 in one end of the bolt guide 61 lies flush with the end face 22a of the bulge 22, the worker can easily visually recognize the bolt inlet 68.

Consequently, it is possible for the worker to insert the bolt 32, which is put on (or magnetically attracted to) the tip end of the screwdriver 70, easily into the bolt guide 61 from the bolt inlet 68. The bolt 32 thus inserted is guided along the tapered inner surface of the partition wall 64 into the bolt hole 60. At this time, the worker does not require any hand mirror or does not have to grope around to confirm the position of the bolt hole 60.

When the vehicle air-conditioning system 12 is installed in place on a vehicle, an obstacle may be positioned over the slanted surface 10a. If such an obstacle exists, then the hand of the worker and the screwdriver 70 approach the bolt inlet 68 obliquely upwardly along the slanted surface 10a at a position slightly above the slanted surface 10a (see FIG. 3). Because the step h has a small dimension, as described above, the bolt 32 put on the tip end of the screwdriver 70 is easily inserted into the bolt inlet 68 without hitting the step h. If the step h has a sufficiently small dimension, the bolt 32 put on the tip end of the screwdriver 70 may be displaced on and along the slanted surface 10a into the bolt inlet 68.

Furthermore, since the lower surface 65 of the partition wall 64 is slanted upwardly toward the bolt hole 60, the bolt 32 is easily inserted along the slanted lower surface 65 into the bolt hole 60.

After the threaded portion 32a of the bolt 32 is inserted into the bolt hole 60, the screwdriver 70 is turned to thread the threaded portion 32a into the self-tapping hole 44.

At this time, the worker cannot visually perceive the bolt 32. However, when the heat seat face 32b of the bolt 32 engages the seat face 58, the worker knows that the bolt 32 has been inserted properly in place because the worker feels a reactive force from the screwdriver 70 if an attempt is made to further insert the bolt 32. An indicia 72 may be marked on the shaft 70a to confirm the relative position of the shaft 70a with respect to the bolt inlet 68 when the bolt 32 has been inserted properly in place. Specifically, when the shaft 70a is inserted into the bolt guide 61 until the indicia 72 is aligned with the bolt inlet 68, the worker may judge that the insertion of the bolt 32 is completed.

The resin-molded cover 10 facilitates the positioning of the bolt 32 with respect to the bolt hole 60 for tightening the bolt 32. The resin-molded cover 10 is removed from the main body 14 easily. Specifically, when the bolt 32 inserted in the bolt hole 60 is to be removed, the shaft 70a of the screwdriver 70 is inserted along the inner surface of the partition wall 64. At this time, the tip end of the shaft 70*a* is easily aligned with the head of the bolt 32 simply by inserting the shaft 70*a* along the inner surface of the partition wall 64. Consequently, the bolt 32 can easily be removed.

Modified bolt guides 61 for the resin-molded cover 10 will be described below with reference to FIGS. 7 through 8C.

Figure 7:
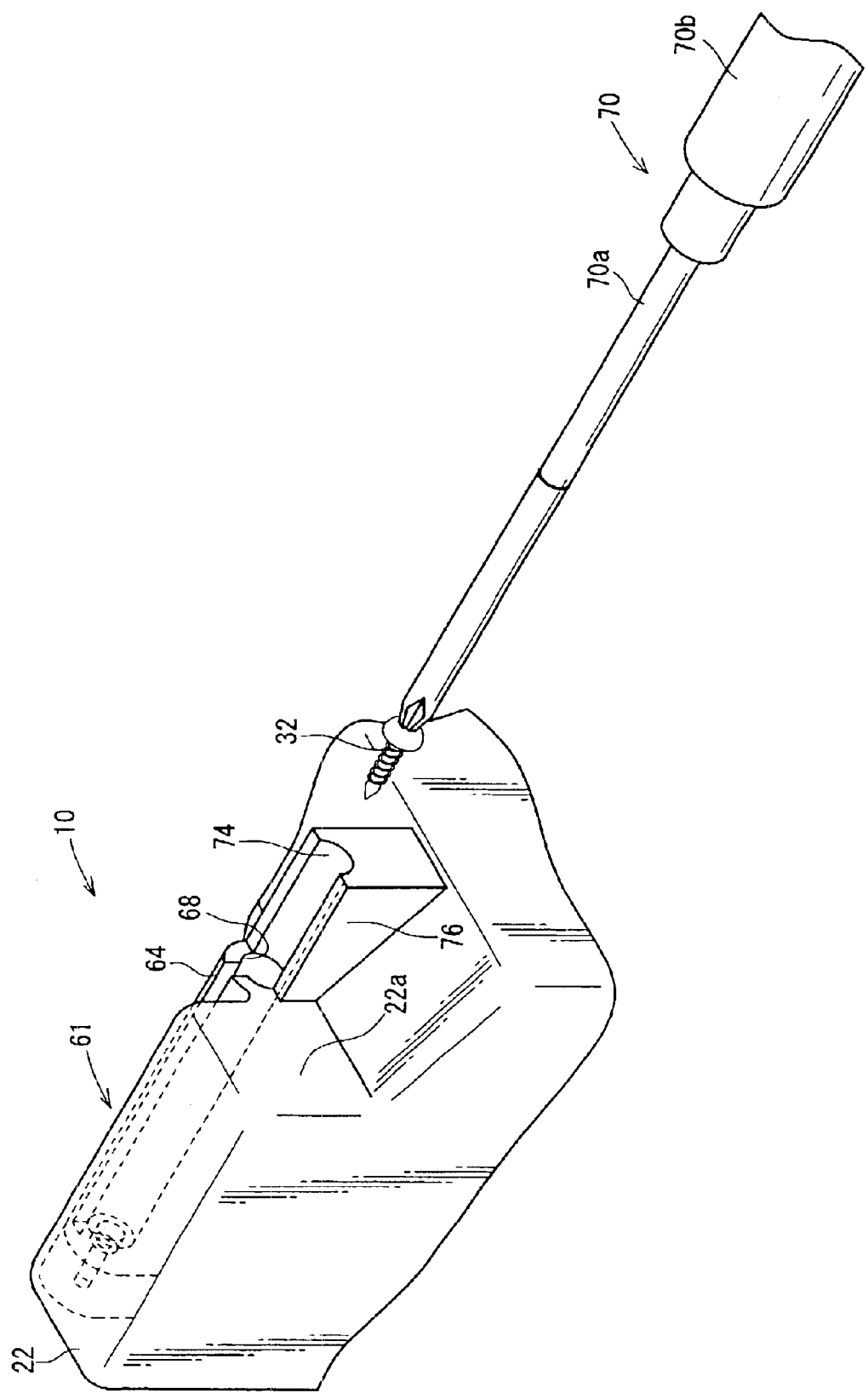
FIG. 7 is an enlarged fragmentary perspective view of a bolt guide and an assistive guide.

In FIG. 7, an assistant guide 76 having a guide groove 74 defined therein is disposed in front of the bolt inlet 68 for easily inserting the bolt 32 into the bolt inlet 68. The guide groove 74 is smoothly joined to a lower portion of the bolt inlet 68 for smoothly inserting the bolt 72 from the guide groove 74 onto the inner surface of the partition wall 64. When the bolt 32 is positioned in the guide groove 74, the worker can see the bolt 32 and hence can confirm how the bolt 32 is put on the screwdriver 70.

In FIG. 8A, a bolt guide 61 has an independent cylindrical shape separate from the bulge 22 or the resin surface 62 (see FIG. 2). The bolt guide 61 has a continuously elongate slit 66 which is not in communication with the bolt inlet 68. Since the slit 66 terminates short of the bolt inlet 68, the bolt inlet 68 has an annular structure which increases the mechanical strength of the bolt guide 61.

In FIG. 8B, a bolt guide 61 has a short hole 78, rather than the slit 66, defined therein near the bolt hole 60. The hole 78 allows the worker to see the bolt hole 60 and nearby areas, and does not lower the mechanical strength of the bolt guide 61.

In FIG. 8C, a bolt guide 61 has two diametrically opposite slits 66*a*, 66*b* defined therein which separate the partition wall into two diametrically opposite partition walls 64*a*, 64*b*. Since the partition walls 64*a*, 64*b* are elastically deformable away from each other, the bolt inlet 68 can have its opening increased in size for easy insertion of the bolt 32 into the bolt inlet 68.

In the above embodiments, the bolts 32 have been described as comprising self-tapping screws. However, the bolts 32 may comprise metric coarse thread bolts, and fixed nuts may be provided in holes defined in the main body 14 in place of the self-tapping holes 34, 36, 38, 40, 42, 44. The heads of the bolts 32 may comprise slotted heads, hexagon heads, hexagon socket heads, or flat heads. The bolts 32 may be used in combination with washers.

If the bolts 32 have flat heads, then the seat faces 58 may be tapered complementarily to the flat heads of the bolts 32. The seat faces 58 that are tapered toward the bolt holes 60 allow the tip ends of the bolts 32 to be inserted with greater ease into the bolt holes 60.

If the bolt guide 61 is molded of a transparent synthetic resin, then the slit 66 may be dispensed with because the worker can see through the bolt guide 61.

The cover 10 and the bolt guide 61, which is part of the cover 10, may be molded of a material other than a synthetic resin, e.g., may be in the form of an aluminum die casting.

Although certain preferred embodiments of the present invention have been shown and described in detail, it should be understood that various changes and modifications may be made therein without departing from the scope of the appended claims.

What is claimed is:

1. A fastening assistance structure comprising:
    a bolt hole for passing therethrough a threaded portion of a bolt for fastening a workpiece to a body;
    a seat face formed on a peripheral edge of said bolt hole for engaging a head seat face of said bolt or a washer combined with said bolt, said bolt hole penetrating through an end of said workpiece to another face opposite said seat face and which abuts against said body when said workpiece is fastened to said body; and
    a guide passage formed in said workpiece, said guide passage extending from a peripheral edge of said seat face for guiding said bolt into said bolt hole, said guide passage having a slit facing at least said bolt hole, wherein said slit does not extend to the other face opposite said seat face, and wherein said threaded portion of said bolt is visible through said slit as said bolt is inserted into said bolt hole.

2. A fastening assistance structure according to claim 1, wherein said slit comprises an elongate hole extending nearly to a bolt inlet which is open at an end of said guide passage, said bolt inlet having an annular shape.

3. A fastening assistance structure according to claim 1, wherein said guide passage has a plurality of said slits each splitting a bolt inlet which is open at an end of said guide passage.

4. A fastening assistance structure according to claim 1, further comprising a guide groove for inserting said bolt into a bolt inlet which is open at an end of said guide passage.

5. A fastening assistance structure according to claim 1, wherein said guide passage has such a tapered shape that the guide passage has an inner wall progressively smaller in diameter toward said bolt hole.

6. A fastening assistance structure according to claim 5, wherein said bolt inlet is displaced out of alignment with said seat face toward said workpiece in which said guide passage is defined.

7. A fastening assistance structure according to claim 1, wherein said guide passage has an outer wall having a constant thickness.

8. A fastening assistance structure according to claim 1, wherein said guide passage has an outer wall of a tapered shape having a thickness progressively larger toward said bolt hole.

9. A fastening assistance structure according to claim 1, wherein said slit comprises a short hole defined therein at a position facing said bolt hole.

10. A fastening assistance structure according to claim 1, wherein said seat face is tapered toward said bolt hole.

11. A fastening assistance structure according to claim 1, further comprising a fixed nut disposed in a hole defined in communication with said bolt hole.

12. A fastening assistance structure comprising:
    a bolt hole for passing therethrough a threaded portion of a bolt for fastening a workpiece to a body;
    a seat face formed on a peripheral edge of said bolt hole for engaging a head seat face of said bolt or a washer combined with said bolt, said bolt hole penetrating through one end of said workpiece to another face opposite said seat face and which abuts against said body when said workpiece is fastened to said body; and
    a guide passage formed in said workpiece, said guide passage extending from a peripheral edge of said seat face for guiding said bolt into said bolt hole, said guide passage being made of a transparent synthetic resin which allows said guide passage to be seen through, wherein said threaded portion of said bolt is visible as said bolt is inserted into said bolt hole.

13. A fastening assistance structure according to claim 12, further comprising a guide groove for inserting said bolt into a bolt inlet which is open at an end of said guide passage.

14. A fastening assistance structure according to claim 12, wherein said guide passage has such a tapered shape that the guide passage has an inner wall progressively smaller in diameter toward said bolt hole.

15. A fastening assistance structure according to claim 14, wherein said bolt inlet is displaced out of alignment with said seat face toward said workpiece in which said guide passage is defined.

16. A fastening assistance structure according to claim 12, passage has an outer wall having a constant thickness.

17. A fastening assistance structure according to claim 12, wherein said guide passage has an outer wall of a tapered shape having a thickness progressively larger toward said bolt hole.

18. A fastening assistance structure according to claim 12, wherein said seat face is tapered toward said bolt hole.

19. A fastening assistance structure according to claim 12, further comprising a fixed nut disposed in a hole defined in communication with said bolt hole.

\* \* \* \* \*